March 19, 1935. F. C. CHEW 1,994,884
PROSPECTING TOOL
Filed April 9, 1934 2 Sheets-Sheet 1
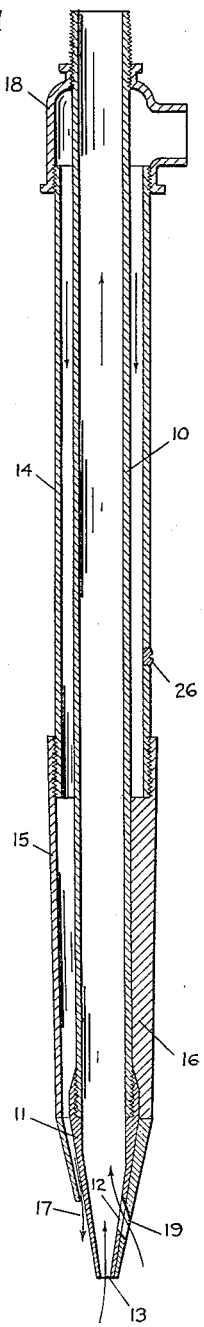
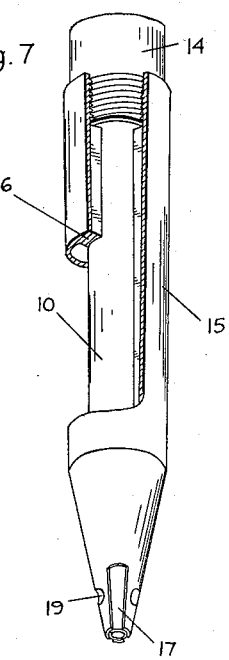
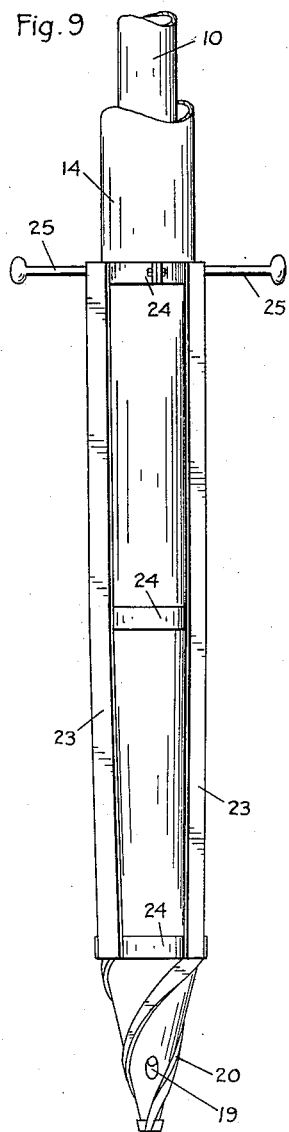
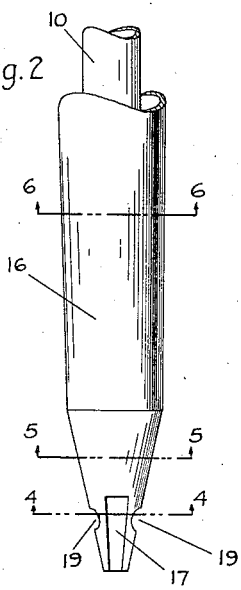
Inventor
F.C. Chew
By Emil V. Lange
Attorney March 19, 1935.  F. C. CHEW  1,994,884
PROSPECTING TOOL
Filed April 9, 1934   2 Sheets-Sheet 2
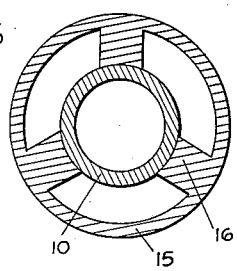
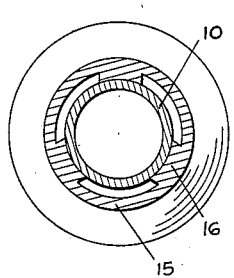
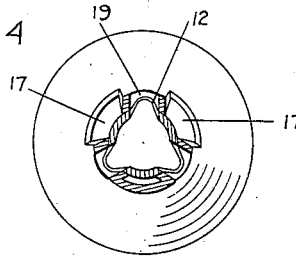
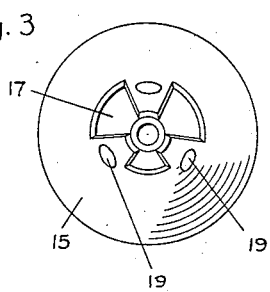
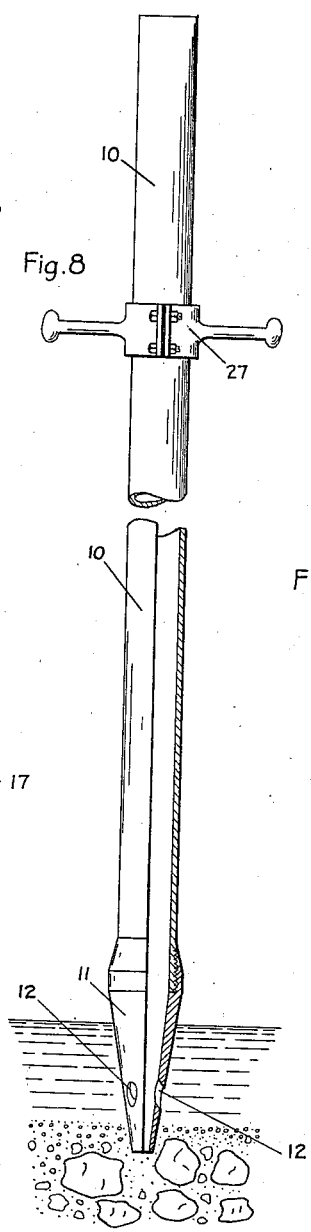
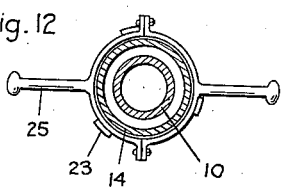
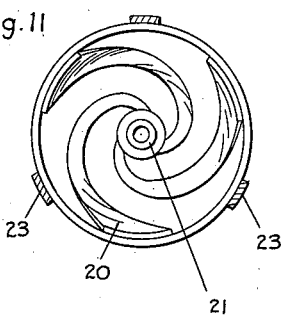
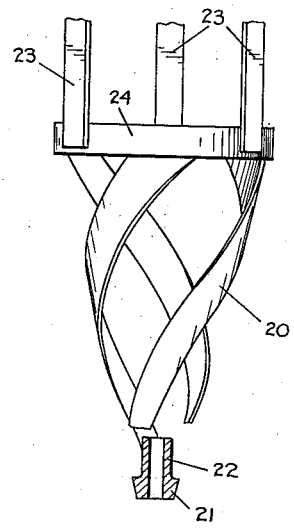
Inventor
F. C. Chew
By Emil F. Lange
Attorney Patented Mar. 19, 1935

1,994,884

UNITED STATES PATENT OFFICE 1,994,884

PROSPECTING TOOL

Fred C. Chew, Grand Island, Nebr.

Application April 9, 1934, Serial No. 719,733

5 Claims. (Cl. 255—1)

My invention relates to prospecting tools for expeditiously obtaining samples of soils at various depths for the purpose of determining the ore content of the soils.

The primary object of my invention is the provision of a tool employing suction either with or without water under pressure to force the tool into the soil and to remove the soil sample at the desired depth, the tool being designed primarily for use in sandy or clayey soils to determine whether or not ore in paying quantities is to be found in the soil.

Another of my objects is the provision of a tool through which water may be discharged under pressure through a nozzle at the lower end of the tool so that the ore sample may be withdrawn through a suction pipe, the soil sample being taken in through the nozzle and in close proximity to the water discharge orifices.

Another object which I have in view is the provision of a device for dislodging pebbles which might otherwise tend to clog the suction pipe.

Another object which I have in view is the provision of a tool having a constricted nozzle at its lower extremity with a gradual reduction in the size of the water passage toward the nozzle so as to increase the velocity of the water discharged to thereby assist in the excavation of the soil at a point immediately in advance of and around the nozzle.

Having in view these objects and others which will be pointed out in the following description, I will now refer to the drawings, in which Figure 1 is a view in vertical median section showing the entire tool.

Figure 2 is an elevational view of the nozzle portion of the tool.

Figure 3 is a view of the lower end of the tool as seen when looking up.

Figure 4 is a cross sectional view on the line 4—4 of Figure 2.

Figure 5 is a cross sectional view on the line 5—5 of Figure 2.

Figure 6 is a cross sectional view on line 6—6 of Figure 2.

Figure 7 is a view in perspective of the nozzle and of the tool, a portion being broken away to disclose the rib arrangement.

Figure 8 is an elevational view of the suction portion of the tool when used alone.

Figure 9 is an elevational view showing the application of the device for dislodging pebbles.

Figure 10 is a view in elevation and partly in section showing the structure of the pebble dislodging device.

Figure 11 is another view of the pebble dislodging device as seen when looking toward the end of the tool.

Figure 12 is a sectional view of the tool showing the handles clamped thereto, the handles being designed for operating the pebble dislodging device.

The tool includes both a water discharge conduit and a suction conduit. The suction conduit 10 terminates at its lower end in a bit 11 which is detachably secured to the conduit 10 as by means of screw threads as shown. The bit 11 is made of hard material to withstand the impacts and abrasion of the sand and gravel and it is provided with four inlet openings. The openings 12 are in the sides of the bit and the opening 13 is in the end of the bit. At its upper extremity the conduit 10 is screw threaded for the attachment of a pipe fitting and also for the connection to a suction pump.

The shell of the tool includes a cylindrical member 14 surrounding the suction conduit 10 and spaced therefrom to afford a passageway for water under pressure. Secured to the lower extremity of the shell 14 is an extension 15 having a plurality, preferably three, of ribs 16 integral therewith. The extension 15 of the shell surrounds the bit 11 as well as the lower portion of the conduit 10 and it terminates in close proximity to the lower extremity of the bit 11. The lower portion of the shell extension 15 is provided with three slotlike openings 17 through which the water may be discharged as best shown in Figure 1.

As shown in Figure 1, the pipe fitting 18 is secured to the walls of both conduits 10 and 14. During the operation of the device water is forced through the pipe fitting 18 to travel between the walls of the conduits 10 and 14. When the water reaches the ribs within the shell extension 15 it divides into a plurality of streams which are gradually narrowed toward the outlet to increase the velocity of the streams of water. It is thus forced out into the soil formation and the loosened soil is then withdrawn through the conduit 10 together with the water in which the soil is suspended. The shell extension at the bit is provided with apertures 19 which register with the apertures 12, these apertures passing through the ribs 16.

In some soil formations there may be pebbles of a size to become lodged in the apertures 19 to thus check the suction flow of water through these apertures. I therefore provide an attachment designed to dislodge such pebbles. As best shown in Figure 9, this attachment includes a screw embracing the bit end of the shell and mounted to be rotated thereon. This screw 20 terminates at its lower extremity in a seat 21 which may rest against the lower end of the bit 11. The seat 21 has a projection 22 which is adapted to seat within the aperture 13. Both the seat 21 and the projection 22 are provided with a passageway extending therethrough as shown in Figure 10. The screw 20 is secured to a plurality of upwardly projecting ribs 23 which in turn are connected by means of annular bands 24 surrounding the extension 15 of the shell 14. The uppermost band 24 has a pair of radially projecting handles 25 which may be grasped to give a partial turn to the screw 20 to thus wipe away any pebbles which may have become lodged in the apertures 19. A very slight turn of the screw will not only dislodge such pebbles but it will force the pebbles into the outflowing streams of water from the slotlike openings 17.

The tool is designed primarily for obtaining soil samples for assay purposes. If the soil sample is to be taken in dry soil, both water under pressure and suction will be employed. The water discharged through the slotlike openings 17 will soften the soil so that the suction stream of water will carry away the soil held in suspension. The water has considerable cutting action in the soil so that the weight of the tool plus the added weight of the operator will soon force it to the desired depth in even the most refractory soils commonly encountered. The sample is then taken when the desired depth has been reached. The screw 20 is to be used only when the soil contains pebbles of the size which are apt to cause trouble. The attachment is so designed that it may be easily attached to surround the shell 15 or to be removed therefrom. In the case of clay or fine sand the attachment is not necessary.

In working with a soil bed in the bottom of a stream especially when the soil is more or less fluent like quick sand, a stream of water under pressure is not necessary. In such cases the screw plug 26 may be removed to allow the water from the stream or river to enter into the opening from whence it will flow out through the slots 17. The suction through the suction conduit 10 will then remove the sand or other soil in the bottom of the stream to carry the tool to the desired depth where the soil sample may be taken.

Mountain streams frequently have a swift current with a rocky bottom. Smaller sand particles become trapped between the rocks and these deposits of sand may be quite rich in ore. The rocks at the same time may prevent the working of the tool below the surface of the soil layer because the larger rocks would obstruct the passage of the bit. In such cases the tool may be used as indicated in Figure 8. The outer shell is entirely removed and only the suction conduit 10 with its bit 11 is employed. By moving this tool around in the bed of such streams the end of the bit can be moved about among the rocks so as to pick up practically all of the sand and gravel and ore particles which have become lodged between the rocks. In this case the water of the stream is used as a vehicle for carrying up the sand particles with their bits of ore.

It will be seen that the prospecting tool is useful in any kind of friable soil which is either dry or wet. In operating in clay or similar soil the water is forced under more or less pressure out through the slots 17 to loosen the soil in advance of the tool.

The tool may thus be sunk to considerable depths and the soil sample may be taken at any desired depth. Where the soil is sandy and wet and where it lies at considerable depths, the water under pressure must be employed to loosen the compacted sand and the pressure of the water must be sufficient for the depth of operation. In working sandy or other soils at shallow depths in the bed of a stream, no pressure is needed since the soil is more or less loose and does not require the cutting action of a stream of water. The removal of the plug 26 will readily admit sufficient water from the stream to mix with the soil which is to be carried up through the suction pipe 10. When the soil carries pebbles of a size to obstruct the apertures 19 the device 20 must be attached to the tool so that the pebbles can readily be dislodged. For gathering the ore bearing sands of streams having rocky bottoms, the shell 14 and its extension 15 are entirely removed and the tool is used in the manner indicated in Figure 8. In such cases the tool must be frequently lifted and shifted from one position to another so as to gather all of the sand and other soil which is lodged between the rocks. For convenience in frequently lifting and lowering the tool it is advisable to employ a handle 27 which embraces the conduit 10 and which may be grasped by both hands to make the shifting of the tool an easy matter. The handles 27 are firmly clamped to the conduit 10 and they may be adjusted to the most convenient position.

Having thus described my invention in such full, clear, and exact terms that its construction and operation will be readily understood by others skilled in the art to which it pertains, what I claim as new and desire to secure by Letters Patent of the United States is:

1. A prospecting tool for obtaining soil samples, said tool including a suction conduit having a frustoconical bit secured thereto at the lower extremity thereof, said bit being provided with a central inlet opening at its lower extremity, a shell surrounding said suction conduit and spaced therefrom to provide a conduit for the downward flow of water under pressure, said shell terminating at its lower extremity in a frustoconical extension spaced from said bit at the upper extremity thereof but tightly embracing said bit at its lower extremity, said extension being provided with a plurality of discharge openings and said bit and said extension being provided with a plurality of registering inlet openings.

2. A prospecting tool including coaxial suction and discharge conduits, a frustoconical bit on said suction conduit, said discharge conduit being spaced from said suction conduit and being gradually tapering in the portion about said bit to tightly embrace said bit at its lower extremity, a plurality of vertical ribs projecting inwardly from the walls of said discharge conduit to direct a stream of water through a plurality of channels, said discharge conduit being provided with a plurality of discharge orifices and said suction conduit being provided with a plurality of inlet openings passing through said ribs.

3. A prospecting tool including a tubular suction member terminating in a frustoconical bit having an inlet opening at its lower extremity, a tubular discharge member surrounding said suction member and spaced therefrom, said discharge member having frustoconical extension tapering toward said bit to tightly embrace said bit at its lower extremity, said extension being provided with a plurality of discharge orifices in close proximity to the lower extremity of said bit, and a plurality of ribs projecting inwardly from said extension and in contact with said suction member to divide the interior of said discharge member into a plurality of channels, said suction member and said ribs being provided with a plurality of registering orifices for the ingress of soil and water.

4. A prospecting tool including spaced coaxial tubular suction and discharge members, a pipe fitting surrounding said suction member and secured to said discharge member and having an opening for admitting water under pressure to the passageway in said discharge member, a frustoconical bit releasably secured to said suction member, a frustoconical extension for said discharge member, said extension being formed to tightly embrace the lower extremity of said bit and being provided with slotlike orifices for the discharge of water from said discharge member, ribs projecting inwardly from the walls of said extension and into close proximity to said suction member and to the upper portion of said bit, said bit and said extension being provided with registering inlet openings for admitting water and soil held in suspension thereby.

5. A prospecting tool including coaxial suction and discharge conduits terminating in frustoconical lower end portions, said lower end portions being provided with discharge and inlet orifices arranged in alternation, a screw surrounding said lower end portions for dislodging pebbles from the inlet openings and for transporting the pebbles into the outflowing streams from the discharge openings, and means for turning said screw about said tool as an axis.

FRED C. CHEW.